United States Patent
Fujimori et al.

(10) Patent No.: US 11,254,000 B2
(45) Date of Patent: Feb. 22, 2022

(54) MACHINE TEACHING TERMINAL, MACHINE, NON-TRANSITORY COMPUTER READABLE MEDIUM STORING A PROGRAM, AND SAFETY CONFIRMATION METHOD FOR TEACHING MACHINE

(71) Applicant: FANUC CORPORATION, Yamanashi (JP)

(72) Inventors: Toshihiro Fujimori, Yamanashi (JP); Tetsuro Matsudaira, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 170 days.

(21) Appl. No.: 16/715,666

(22) Filed: Dec. 16, 2019

(65) Prior Publication Data

US 2020/0223062 A1 Jul. 16, 2020

(30) Foreign Application Priority Data

Jan. 11, 2019 (JP) .............................. JP2019-003171

(51) Int. Cl.
*B25J 9/16* (2006.01)
*B25J 13/08* (2006.01)
*B25J 13/06* (2006.01)

(52) U.S. Cl.
CPC ............. *B25J 9/163* (2013.01); *B25J 9/1676* (2013.01); *B25J 13/06* (2013.01); *B25J 13/08* (2013.01)

(58) Field of Classification Search
CPC . B25J 9/163; B25J 9/1676; B25J 13/06; B25J 13/08; B25J 9/1674; B25J 9/1656;

(Continued)

(56) References Cited

U.S. PATENT DOCUMENTS 5,937,143 A * 8/1999 Watanabe .............. B25J 9/1671
700/264
5,956,465 A * 9/1999 Takagi ............. G05B 19/41815
700/255

(Continued)

FOREIGN PATENT DOCUMENTS

CN 106487996 3/2017
JP 9-81228 3/1997

(Continued)

OTHER PUBLICATIONS

Notification of Reasons for Refusal dated Mar. 30, 2021 in Japanese Patent Application No. 2019-003171.

*Primary Examiner* — Jaime Figueroa
(74) *Attorney, Agent, or Firm* — Wenderoth, Lind & Ponack, L.L.P.

(57) ABSTRACT

To provide a machine teaching terminal, a machine, a program, and a safety confirmation method capable of ensuring the safety of a worker without providing an additional device or the like. A machine teaching terminal communicably connected to a robot so as to be used for teaching the robot within a work area of the robot includes a touch panel display configured to accept input performed by a worker, an input detection part configured to detect input to the touch panel display, an abnormality detection part configured to detect an abnormal state on the basis of the detection by the input detection part, and an abnormal signal transmission part configured to transmit, in the case where the abnormality detection part detects the abnormal state, a signal indicating the abnormal state to the robot.

14 Claims, 14 Drawing Sheets

(58) Field of Classification Search
CPC ......... B25J 9/1602; G05B 2219/36159; G05B 2219/36168
USPC .................................................. 700/245–264
See application file for complete search history.

(56) References Cited

U.S. PATENT DOCUMENTS

| | | | | |
|---|---|---|---|---|
| 6,088,628 | A * | 7/2000 | Watanabe | B25J 9/1656 700/251 |
| 6,167,328 | A * | 12/2000 | Takaoka | B25J 9/1671 318/568.1 |
| 9,782,895 | B2 * | 10/2017 | Kanada | B25J 9/1656 |
| 2013/0009896 | A1 * | 1/2013 | Zaliva | G06F 3/044 345/173 |
| 2016/0274787 | A1 * | 9/2016 | Sugano | A61B 34/30 |
| 2017/0021496 | A1 * | 1/2017 | Kanada | B25J 9/1656 |
| 2018/0113435 | A1 * | 4/2018 | Tateoka | G06F 3/0488 |
| 2020/0174445 | A1 * | 6/2020 | Hisayuki | G05B 19/402 |
| 2021/0078182 | A1 * | 3/2021 | Watanabe | G05B 19/42 |

FOREIGN PATENT DOCUMENTS

| | | |
|---|---|---|
| JP | 9-85655 | 3/1997 |
| JP | 2005-74554 | 3/2005 |
| JP | 2015-41184 | 3/2015 |
| JP | 2016-68160 | 5/2016 |
| JP | 2018-72882 | 5/2018 |
| JP | 2018-101945 | 6/2018 |
| WO | 2012/143053 | 10/2012 |
| WO | 2016/181734 | 11/2016 |

\* cited by examiner

MACHINE TEACHING TERMINAL, MACHINE, NON-TRANSITORY COMPUTER READABLE MEDIUM STORING A PROGRAM, AND SAFETY CONFIRMATION METHOD FOR TEACHING MACHINE

This application is based on and claims the benefit of priority from Japanese Patent Application No. 2019-003171, filed on 11 Jan. 2019, the content of which incorporated herein by reference.

BACKGROUND OF THE INVENTION

Field of the Invention

The present invention relates to a machine teaching terminal, a machine, a non-transitory computer readable medium storing a program, and a safety confirmation method for teaching a machine.

Related Art

Conventionally, in some cases, a machine represented by an industrial robot is operated in a space where the machine and a worker coexist. In the case where the worker operates the machine in such a work area, the safety of the worker needs to be ensured by avoiding unexpected action of the machine. Therefore, the teaching operation panel on which the worker performs operations is provided with a dead man switch for bringing the machine into an emergency stop state, in general. In a case where the worker falls into a dangerous state, the worker makes the machine stop urgently, such as by holding the dead man switch strongly or by taking the hands off from the dead man switch.

The art recently desired from the viewpoint of cost reduction and ensuring versatility is to make a machine emergently stop when a worker falls into a dangerous state, while ensuring safety by the use of a general purpose mobile device, for example, a tablet terminal or a smartphone, without the use of a dedicated teaching operation panel (refer to, for example, Patent Document 1). Patent Document 1 discloses that "a safe input device configured to input a signal for safety to a robot controller, in a case where an operation terminal (7) outputs an operation signal for making a robot operate to the robot controller, on the basis of input operation performed on a touch panel part (71) of the operation terminal (7) by a worker, the safe input device comprising: an operation input member (8) having a grip part (8a) to be gripped by the worker with a hand and an operation part (8b) connected to one end part of the grip part (8a), the operation part (8b) having a tip part (8b21) formed in a tapered shape, the tip part (8b21) being brought into contact with the touch panel part (71) in input operation; and an enabling switch (9) disposed on the operation input member (8), the enabling switch (9) allowing operation by the hand gripping the grip part (8a)."

Patent Document 1: Japanese Unexamined Patent Application, Publication No. 2016-68160

SUMMARY OF THE INVENTION

As described above, there is a method of using a device configured input signal for safety to a robot controller, other than an operation terminal for teaching. A machine teaching terminal desired, capable of ensuring the safety or a worker without using an additional device or the like.

(1) In one aspect of the present disclosure, a machine teaching terminal (for example a "machine teaching terminal 1" to be described below) is communicably connected to a machine (for example, a "robot 5" to be described below) so as to be used for teaching the machine within a work area of the machine. The machine teaching terminal includes a touch panel (for example, a "touch panel display 36" to be described below) configured to accept input performed by a worker, an input detection part (for example, an "input detection part 14" to be described below) configured to detect input to the touch panel, an abnormality detection part (for example, an "abnormality detection part 16" to be described below) configured to detect an abnormal state on the basis of the detection by the input detection part, and an abnormal signal transmission part (for example, an "abnormal signal transmission part 17" to be described below) configured to transmit, in the case where the abnormality detection part detects the abnormal state, a signal indicating the abnormal state to the machine.

(2) In the machine teaching terminal according to (1), the abnormality detection part may detect the abnormal state in the case where an input path formed by the continuous input detected by the input detection part fails to satisfy a specified condition.

(3) The machine teaching terminal according to (2) may include a start point output part (for example, a "start point output part 11" to be described below) configured to output a predetermined range including a start point, to a display (for example, a "touch panel display 36" to be described below). The input path satisfying the specified condition may be formed by repeated input of protruding to an outside from an inside of the predetermined range and thereafter returning back to the predetermined range.

(4) In the machine teaching terminal according to (3), the start point output part may output the start point and the predetermined range to the display, and the input path satisfying the specified condition may be formed by repeated input, of moving away from a vicinity of the start point by a certain distance and thereafter returning back to the predetermined range, within a certain time.

(5) In the machine teaching terminal according to (2), the input path satisfying the specified condition may be formed in the case where a shifting amount in touch operation per a certain time is equal to or greater than a first predetermined amount or less than a second predetermined amount, and the first predetermined amount and the second predetermined amount may be variably set for each worker.

(6) The machine teaching terminal according to any one or (2) to (5) may include a teaching part (for example, a "teaching part 19" to be described below) configured to perform, on the basis of not only the input path formed by the continuous input detected by the input detection part but also input additionally detected by tale input detection part, teaching based on the detection.

(7) The machine teaching terminal according to (1) may include a safe input area output part (for example, a "safe input area output part 212" to be described below) configured to output, to a display, a safe input area corresponding to a range allowing the worker to perform input indicating being in a safe input state. The abnormality detection part (for example, an "abnormality detection part 216" to be described below) may detect the abnormal state in the case where an input path formed by the continuous input detected by the input detection part moves from the safe input area to an outside of the safe input area.

(8) In the machine teaching terminal according to (7), the safe input area may be different from a teaching area corresponding to an area allowing the machine to be taught. The machine teaching terminal may include a teaching part (for example, a "teaching part 219" to be described below) configured to perform, in the case here a position of the input detected by the input detection part is within the teaching area, teaching based on the detection.

(9) The machine teaching terminal according to any one of (2) to (8) may include a path output part (for example, a "path output part 15" to be described below) configured to output the input detected by the input detection part to the display.

(10) The machine teaching terminal according to may include a teaching area output part (for example, a "teaching area output part 313" to be described below) configured to output a teaching area corresponding to an area allowing the machine to taught to a display, and a teaching part (for example, a "teaching part 319" to be described below) cons-inured to perform, in the case where the input detection part detects input in the teaching area, teaching based on the detection. The abnormality detection part (for example, an "abnormality detection part 316" to be described below) may detect the abnormal state in the case where a position of the input detected by the input detection part is outside the teaching area.

(11) The machine teaching terminal according to any one of (1) to (10) may include a mode switching part (for example, a "mode switching part 21" be described below) configured to switch a mode between a teaching mode for teaching the machine and a non-teaching mode other than the teaching mode. The abnormality detection part may detect the abnormal state in the case where the teaching mode is set by switching by the mode switching part.

(12) In the machine teaching terminal according to (11), the mode switching part may switch the non-teaching mode to the teaching mode in the case where the input detection part continues to detect a touch at a specific position on the touch panel in a certain time or where the input detect on part: continues detect a plurality of times of touches within a specified area on the touch panel in a certain time.

(13) The machine configured to perform work based on a signal from the machine teaching terminal according to any one of (1) to (12) includes an immediate stop part (for example, an "immediate stop part 42" to be described below) configured to immediately stop the machine in the case where the signal indicating the abnormal state is received.

(4) In one aspect of the present disclosure, a non-transitory computer readable medium storing a program for a computer (for example, a "machine teaching terminal 1" to be described below) is communicably connected to a machine so as to be used for teaching the machine in a work area of the machine. The computer comprises a touch panel configured to accept input performed by a worker. The computer is made to execute steps including an input detection step of detecting an input to the touch panel, an abnormality detection step of detecting an abnormal state on the basis of the detection in the input detection step, and an abnormal signal transmission step of, in the case where the abnormal state is detected in the abnormality detection step, transmitting a signal indicating the abnormal state to the machine.

(15) In one aspect of the present disclosure, a safety confirmation method provided for a machine teaching terminal communicably connected to a machine so as to be used for teaching the machine within a work area of the machine. The machine teaching terminal comprises a touch panel configured to accept input performed by a worker. The safety confirmation method to be executed by the machine teaching terminal includes an input detection step of detecting an input to the touch panel, an abnormality detection step of detecting an abnormal state on the basis of the detection in the input detection step, and an abnormal signal transmission step of, in the case where the abnormal state is detected in the abnormality detection step, transmitting a signal indicating the abnormal state to the machine.

One aspect of the present disclosure enables to provide a machine teaching terminal, a machine, a non-transitory computer readable medium storing a program, and a safety confirmation method capable of ensuring the safety of a worker without attaching an additional device or the like.

DETAILED DESCRIPTION OF THE INVENTION

First Embodiment

The outline of one aspect of an embodiment is described first. The first embodiment relates to a machine teaching terminal configured to teach a machine represented by an industrial robot. The first embodiment relates to the machine teaching terminal configured to confirm a safe input state thereof by the use of an input path.

[Teaching System 100]

Figure 1:
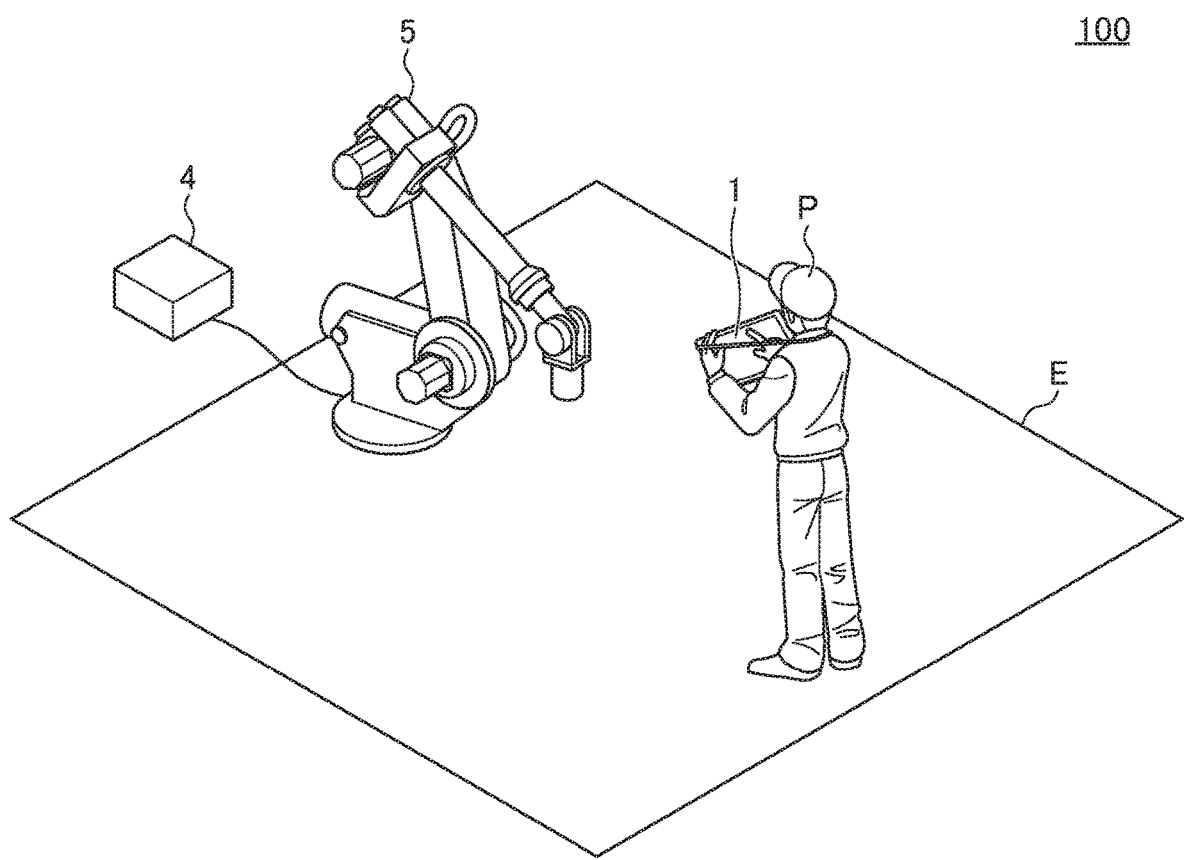
FIG. 1 is an overall schematic diagram of a teaching system according to a first embodiment.

A teaching system 100 is configured to teach a robot 5 (machine) by the use of a machine teaching terminal 1. In the descriptions of the embodiments below, the robot 5, which is an industrial robot, is used as one example of such a machine. The teaching system 100 shown in FIG. 1 includes the machine teaching terminal 1, a robot control device 4, and the robot 5. The machine teaching terminal 1 and the robot control device 4 are communicably connected by wireless connection via, for example, a communication network. The communication network for example, a LAN (local area network). The communication system in the communication network is not limited to a specific system.

The robot control device 4 and the robot 5 are directly and mutually connected via, for example, a connection interface. It is noted that the connection may be provided via a communication network. The communication system the communication network is not limited to a specific system, and the connection may be either a wired connection or a wireless connection. In the following description of the present embodiment, the robot control device 4 and the robot 5 are configured separately. Alternatively the robot control device and the robot 5 may be configured integrally in one machine.

In the teaching system 100, a worker P operates the machine teaching terminal 1 so as to teach the robot 5. At the time of teaching, the worker P and the robot 5 coexist in a work area E, which is a shared space. Therefore, the teaching system 100 needs to perform processing for confirming the safety of the worker P.

[Machine Teaching Terminal 1]

The machine teaching terminal 1 is communicably connected to the robot control device 4 configured to control the robot 5, and is configured to teach a predetermined operation to the robot 5 by transmitting a signal to the robot control device 4. The machine teaching terminal 1 is a portable terminal represented by for example, a tablet terminal or a smartphone. The machine teaching terminal 1 may be a general-purpose terminal having other functions but is not limited to a dedicated terminal configured to teach the robot 5.

Figure 2:
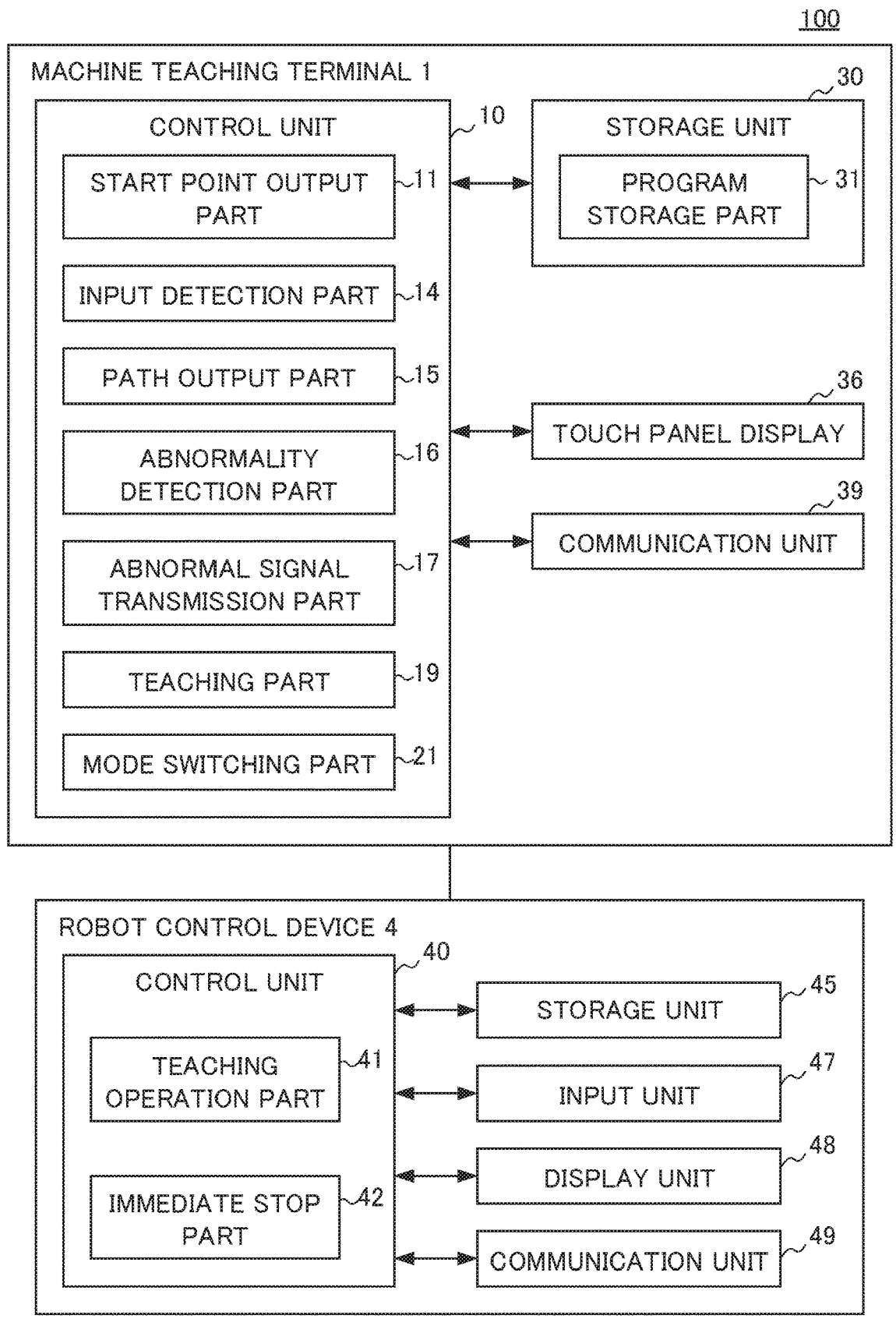
FIG. 2 is a functional block diagram of a machine teaching terminal and a robot control device according to the first embodiment.

As shown in FIG. 2, the machine teaching terminal 1 includes a control unit 10, a storage unit 30, a touch panel display 36, and a communication unit 39. The control unit 10, which may be a CPU (central processing unit), integrally controls the machine teaching terminal 1 by executing various types of programs for controlling the machine teaching terminal 1 stored in a program storage part 31 of the storage unit 30. The control unit 10 includes a start point output part 11, an input detection part 14, an abnormality detection part 16, an abnormal signal transmission part 17, a teaching part 19, and a mode switching part 21. Each of the functional parts is realized when the control unit 10 executes a program stored in the program storage part 31. As will be described below, the control unit 10 may include a path output part 15.

The start point output part 11 outputs, to the touch panel display 36, the start point which is the position at which the operation representing a safe input state is started and the returning area which indicates a predetermined range including the start point. The input detection part 14 detects input to the touch panel display 36. The path output part 15 outputs the input path formed by the continuous input detected by the input detection part 14 to the touch panel display 36. In this case, the path output part 15 may not output the entire input path formed by the continuous input detected by the input detection part 14. For example, the path output part 15 may output a part of the path, for example, the part from protruding to the outside of the returning area to returning back into the returning area, out of the repeated input to be described below, and may delete the output path when the input returns to the returning area. It is noted that, as described above, the control unit 10 may not include the path output part 15.

The abnormality detection part 16 determines whether or not the input path formed by the continuous input detected by the input detection part 14 satisfies a specified condition. In the case where the input path fails to satisfy the specified condition, the abnormality detection part 16 detects an abnormal state. The specified condition herein relates to a predetermined input path. For example, the input path satisfying the specified condition is the path having a cyclic pattern, which is formed by the repeated input of starting in the vicinity of the start point, moving away from the start point by a certain distance, and thereafter returning back to the returning area within a certain time. Under the safe input state, the worker P is able to repeat the input of starting in the vicinity of the start point, moving away from the start point by a certain distance, and thereafter returning back to the returning area within a certain time (for example, in several seconds). It is noted that a certain time and/or a certain distance may set for each worker P. If the worker P encounters a dangerous state, that is, if the worker P falls into an abnormal state, the worker P may stop operation or may take the hands off from the touch panel display 36, and thus the input having tee performed so far may not be performed any longer. When the input path fails to satisfy the specified condition, the abnormality detection part 16 detects an abnormal state.

In the case where the abnormality detection part 16 detects an abnormal state, the abnormal signal transmission part 17 transmits, to the robot control device 4, the emergency stop signal which indicates the abnormal state. In the case where the input detection part 14, during when detecting the input indicating the safe input state, further detects different input, the teaching part 19 transmits, to the robot control device 4, a teaching signal for performing the teaching based on the detection.

The mode switching part 21 performs switching between a teaching mode and a normal screen operas on mode (non-teaching mode) other than the teaching mode. The teaching mode herein is a mode to teach the robot 5, and the robot 5 is allowed to be taught only in the teaching mode.

The storage unit 30 is the storage area in which the programs to be executed by tale control unit 10 and the like are stored. The storage unit 30 includes the program storage part 31. The program storage part 31 stores various types of programs to be executed by the control unit 10 of the machine teaching terminal 1. The program storage part 31 stores the teaching program for executing the various types of functions of the control unit 10 described above. In the case of a general-purpose terminal, the program storage part 31 may store other programs tar executing various types or functions.

The touch panel display 36 functions both as an input unit with the touch panel which accepts a touch operation by the finger of the worker P and as a display unit with a display. The communication unit 39 is the communication control device configured to exchange data with an external device (for example, the robot control device

[Robot Control Device 4]

The robot control device 4 is configured to control the robot 5 so as to make the robot 5 perform a predetermined operation. As shown FIG. 2, the robot control device 4 includes a control unit 40, a storage unit 45, an input unit 47, a display unit 48, and a communication unit 49. The control unit 40, which may be a CPU, integrally controls the robot control device 4 by executing various types of programs for controlling the robot control device 4 stored in the storage unit 45.

The control unit 40 includes a teaching operation part 41 and an immediate stop part 42. These functional parts are realized when the control unit 40 executes the programs stored in the storage unit 45. The teaching operation part 41 teaches the robot 5 on the basis of the teaching signal received from the machine teaching terminal 1. The immediate stop part 42 immediately stops the robot 5 on the basis of the emergency stop signal received from the machine teaching terminal 1. It is noted that the control unit 40 includes not only the functional blocks described above but also, for example, general functional blocks such as a motor driving amplifier configured to amplify an operation command. However, since these general functional blocks are well known to those skilled in the art, detailed descriptions and illustrations thereof are omitted.

The storage unit 45 is the storage area in which the programs to be executed by the control unit 40 and the like are stored. The input unit 47 is an input device, for example, a keyboard or a mouse. The display unit 48 is a display device, for example, an LCD (liquid crystal display). It is noted that the operation panel having the functions of the input unit 47 and the display unit 48 may be included. The communication unit 49 is the communication control device configured to exchange data with an external device (for example, the machine teaching terminal 1 or the robot 5).

[Robot 5]

The robot 5 is, for example, a six-axis articulated robot and has, for example, a hand capable of gripping a workpiece. The robot 5 performs an operation in accordance with a teaching command issued by the robot control device 4. Examples of the operation performed in accordance with a teaching command include the operation of carrying a workpiece. The robot 5 stops the operation in accordance with the emergency stop command issued by the robot control device 4.

The processing in the machine teaching terminal 1 is described below by referring to the drawings.

[Mode Setting Processing]

Figure 3:
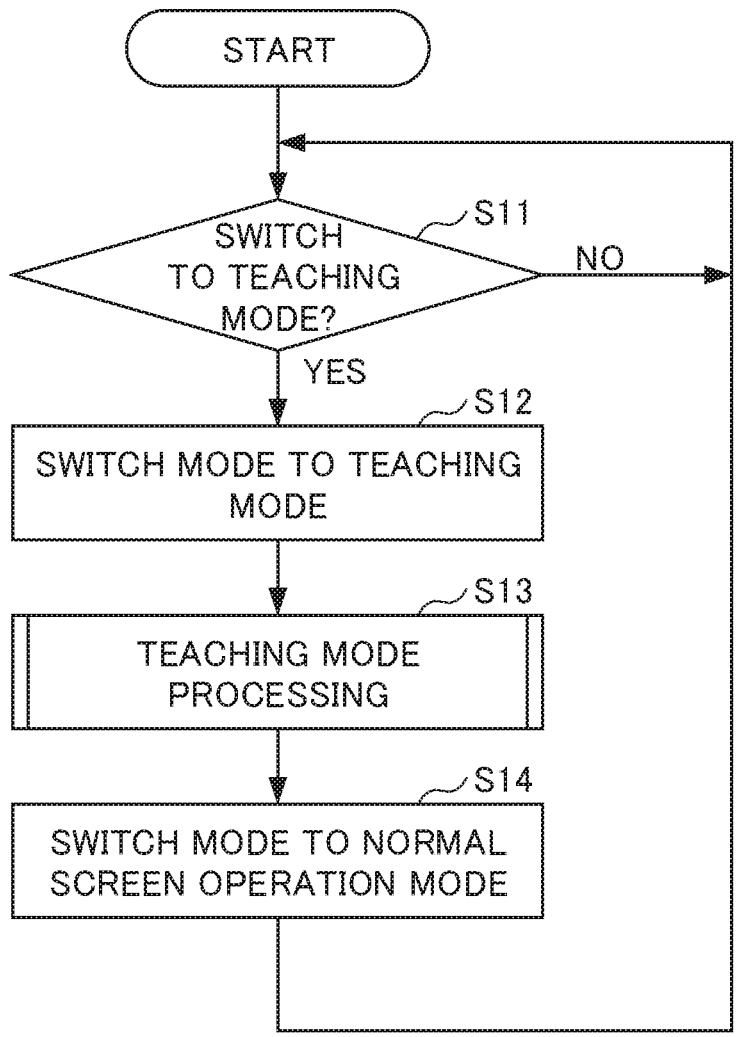
FIG. 3 is a flowchart indicating mode setting processing of the machine teaching terminal according to the first embodiment.

The mode setting processing in the machine teaching terminal 1 is described first on the basis of FIG. 3. In the case where the worker P turns on the machine teaching terminal 1 and starts the teaching program stored in the program storage part 31, the machine teaching terminal 1 is set in a normal screen operation mode as an initial value by the control unit 10 (the mode switching part 21) of the machine teaching terminal 1.

In step S11 (hereinafter, "step S" is simply re erred to as "S") shown in FIG. 3, the control unit 10 (the input detection part 14, the mode switching part 21) determines whether to switch a mode to the teaching mode. The control unit 10 may determine whether to switch a mode to the teaching mode by determining, for example, whether a switching operation has been accepted. The switching operation herein is a certain operation determined in advance, and may be, for example, the operation in which the input detection part 14 continues to detect a touch at a specific position on the touch panel display 36 for a certain time or longer. The switching operation may be, for example, the operation in which the input detection part 14 continues to detect a plurality of times of touch operations in a specified area on the touch panel display 36 in a certain time. The control unit 10 may determine whether to switch a mode to the teaching mode by determining, for example, whether or not the selection of the switching button for switching a mode to the teaching mode output on the screen has been accepted. In the case where a mode is to be switched to the teaching mode (S11: YES), the control unit 10 advances the processing to S12. On the other hand, in the case where a mode is not to be switched to the teaching mode (S11: NO), the control unit 10 makes the processing remain in the present step.

In S12, the control unit 10 (the mode switching part 21) switches the normal screen operation mode to the teaching mode. In S13, the control unit 10 executes the teaching mode processing. The teaching mode processing will be described below. In S14, the control unit 10 (the mode switching part 21) switches the teaching mode to the normal screen operation mode. The control unit 10 thereafter returns the processing to S11 unless the teaching program is to be terminated.

[Teaching Mode Processing]

The teaching mode processing is described below on the basis of FIG. 4. In S30 shown in FIG. 4, the control unit 10 (the start point output part 11) of the machine teaching terminal 1 executes start point output processing. With the start point output processing by the control unit 10, for example, a teaching screen image 60 shown in FIG. 5A output on the touch panel display 36. The teaching screen image 60 includes a start point 60a, a returning area 60b, and a guide of distance 60c indicated by bidirectional arrow. The start point 60a indicates the position at which the operation representing the safe input state is started. The returning area 60b indicates a predetermined range to which the input path having been started from the start point 60a returns within a certain time guide of distance 60c is an indicator for indicating a certain distance. It is noted that the returning area 60b may have a circle shape or other shape, not limited to a rectangle shape. Each of the start point 60a and the guide of distance 60c may be indicated in any other form as long as the form is able to indicate a target item. It is noted that the teaching screen image 60 may have icons for teaching on the right side of the screen image, as an example.

Figure 4:
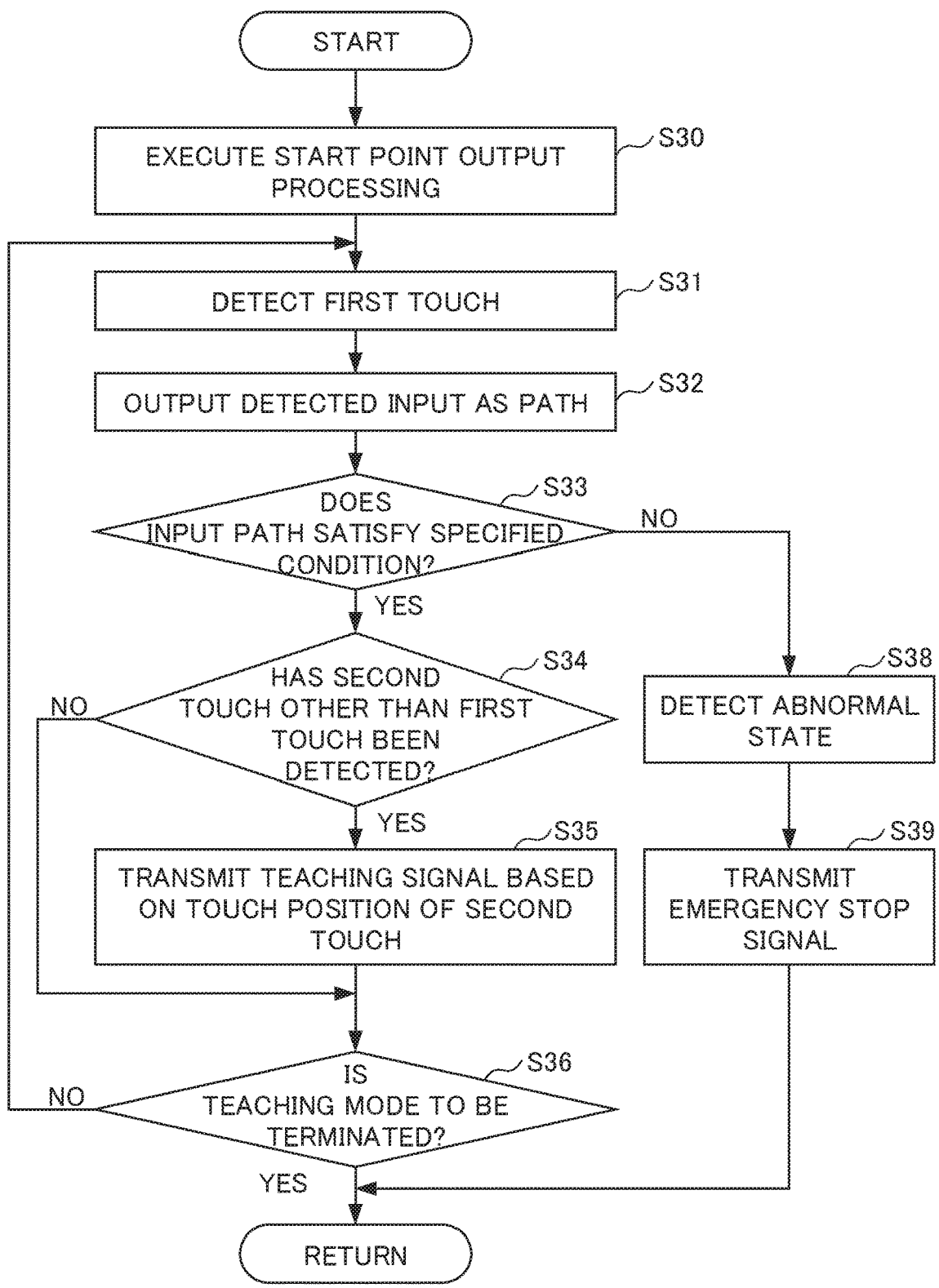
FIG. 4 is a flowchart indicating teaching mode processing of the machine teaching terminal according to the first embodiment.

When the worker P touches the start point 60a in the teaching screen image 60 displayed on the touch panel display 36, the control unit 10 (the input detection part 14) in S31 shown in FIG. 4 detects a first touch at the position of the start point 60a in the teaching screen image 60. In S32, the control unit 10 (the path output part 15) outputs the detected input as a path to the touch panel display 36.

In S33 shown in FIG. 4, the control unit 10 determines whether or not the input path satisfies the specified condition. The example shown in FIG. 5B illustrates an input path 60d, which is formed by the repeated input of, on the basis of the operation by the worker P, starting in the vicinity of the start point, moving away from the start point by a certain distance indicated by the guide of distance 60c, and thereafter returning back to the returning area within a certain time. It is noted that, in S32, the control unit 10 may output a part of the input path 60d shown in FIG. 5(B). In the case where the input path satisfies the specified condition (S33: YES), the control unit 10 advances the processing to S34. On the other hand, in the case where the input path fails to satisfy the specified condition (S33: NO), the control unit 10 advances the processing to S38.

In S34, the control unit 10 (the input detection part 14) determines whether or not a second touch, which is an additional touch, has been detected in addition to the first touch. In the present example, the first touch is assumed to be performed by the worker P with the left finger, and the second touch is assumed to be performed by the worker P with the right finger. In the case where the second touch has been detected (S34: YES), the control unit 10 advances the processing to S35. On the other hand, in the case where the second touch has not been detected (S34: NO), the control unit 10 advances the processing to S36. In S35, the control unit 10 (the teaching part 19) transmits the teaching signal corresponding to the touch position of the second touch to the robot control device 4.

In S36, the control unit 10 (the input detection part 14) determines whether to terminate the teaching mode. The control unit 10 is able to determine whether to terminate the teaching mode on the basis of, for example, whether or not the selection of the switching button output on the screen image for switching a mode to the normal screen operation mode has been accepted. In the case where the teaching mode is to be terminated (S36: YES), the control unit 10 returns the processing to S14 shown in FIG. 3. On the other hand, in the case where the teaching mode is not to be terminated (S36: NO), the control unit 10 returns the processing to S31.

In S38, the control unit 10 (the abnormality detection part 16) detects an abnormal state. In S39, the control unit 10 (the abnormal signal transmission part 17) transmits the emergency stop signal to the robot control device 4. The control unit 10 thereafter returns the processing to S14 shown in FIG. 3.

(Modification 1)

In the example described above, in S32, the control unit 10 outputs the detected input as a path to the touch panel display 36. The present invention is not limited thereto. As described above, the control unit 10 may output a part of the path, such as the part from protruding to the outside of the returning area to returning back into the returning area, out of the repeated input and may delete the path having been output when the input returns to the returning area. Alternatively, S32 may not be included.

(Modification 2)

In the example described above, after the control unit 10 (the abnormal signal transmission part 17) transmits the emergency stop signal to the robot control device 4 in S39, the control unit 10 returns the processing to S14 (the step of switching a mode to the normal screen operation mode) shown in FIG. 3. The present invention is not limited thereto. The control unit 10 under the state of emergency stop may wait for a command issued by the worker P.

(Modification 3)

Figure 5A:
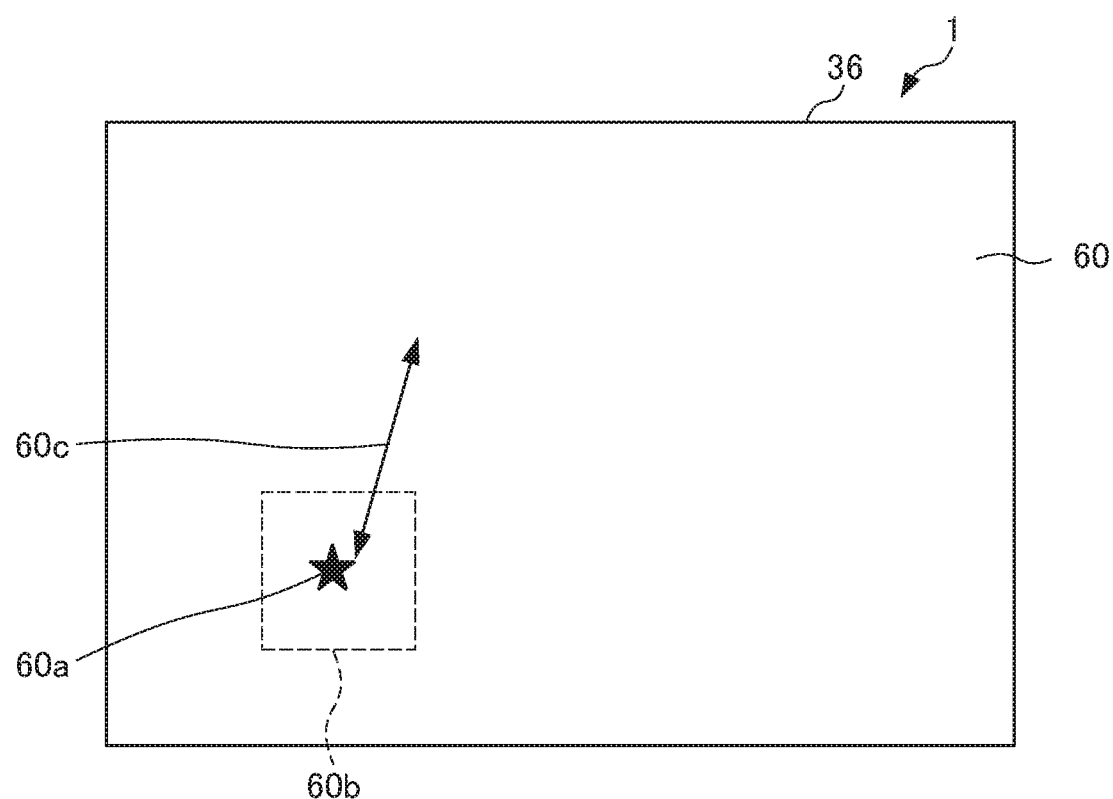
FIG. 5A is a diagram illustrating a screen image example of the machine teaching terminal according to the first embodiment.
Figure 5B:
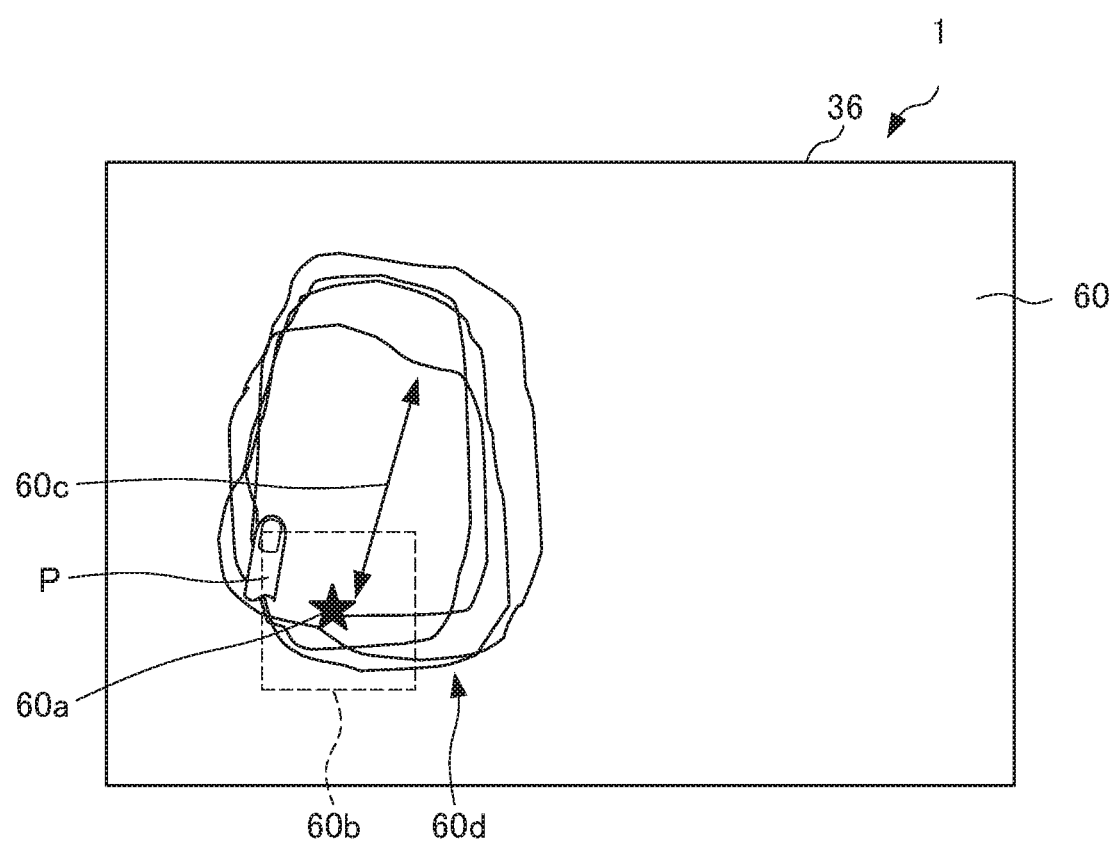
FIG. 5B a diagram illustrating an operation example performed on the machine teaching terminal according to the first embodiment.
Figure 6:
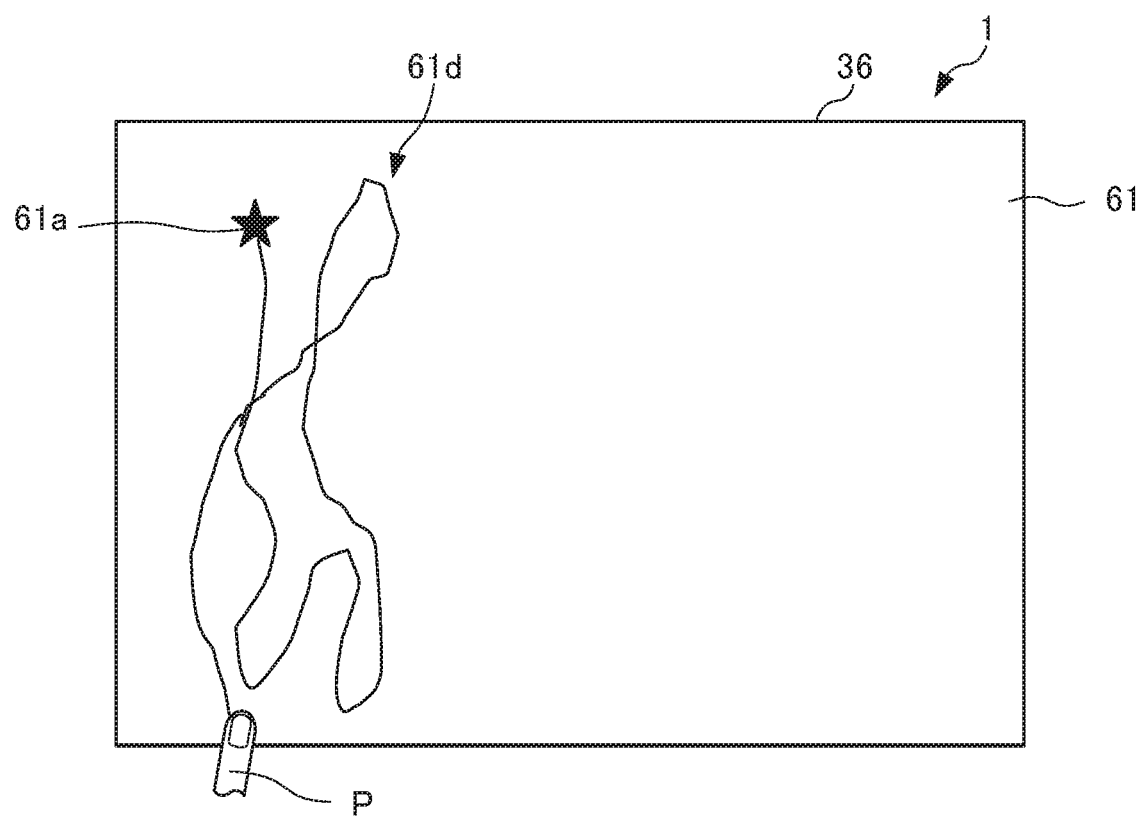
FIG. 6 is a diagram illustrating another screen image example and another operation example on the machine teaching terminal according to the first embodiment.

In the example described above, the control unit 10 (the start point output part 11) executes the start point output processing to output the teaching screen image 60 shown in FIG. 5A. Alternatively, the control unit 10 may output, for example, a teaching screen image 61 shown in FIG. 6. The teaching screen image 61 includes only a start point 61a. The control unit 10 then determines whether or not the input path satisfies a specified condition. The specified condition herein is not limited to the condition described above. The example shown in FIG. 6 indicates the path formed by the input which has started in the vicinity of the start point and continues to move by shifting amount in touch operation per a certain time, equal to or greater than a first predetermined amount. In this case, the control unit 10 is able to calculate the acceleration of the touch operation on the basis of the shifting amount in touch operation per a certain time.

Under the safe input state, the worker P is able to repeat the input having a shifting amount in touch operation per a certain time, equal to or greater than the first predetermined amount. However, if the worker P encounters a dangerous state, that is, if the worker P falls into an abnormal state, the worker P may stop the operation, and thus the input having been performed so far may not be performed any longer. Accordingly, the control unit 10 may determine that the input state is the safe input state in the case where the shifting amount in touch operation per a certain time to form the input path is equal to or greater than the first predetermined amount.

As another example, under the safe input state, the worker P is able to repeat the input having a shifting amount in touch operation per a certain time, equal to or less than a second predetermined amount. However, if the worker P encounters a dangerous state, that is, if the worker P falls into an abnormal state, the worker P may move the hands greatly in an instant, and the input having been performed so far may not be performed any longer. Accordingly, the control unit 10 may determine that the input state is the safe input state in the case where the shifting amount in touch operation per a certain time to form the input path is equal to or less than the second predetermined amount.

It is noted that the first predetermined amount and the second predetermined amount may be variably set for each worker P. In the description above, the teaching screen image 61 shown in FIG. 6 indicates the start point 61a. Alternatively, the start position may be an arbitrary position, and thus the start point 61a may not be output.

[Machine Control Processing in Teaching Mode]

The machine control processing in the teaching mode of the robot control device 4 is described below on the basis of FIG. 7. The control unit 40 of the robot control device 4 starts the machine control processing in the teaching mode when the machine teaching terminal 1 is in the teaching mode.

Figure 7:
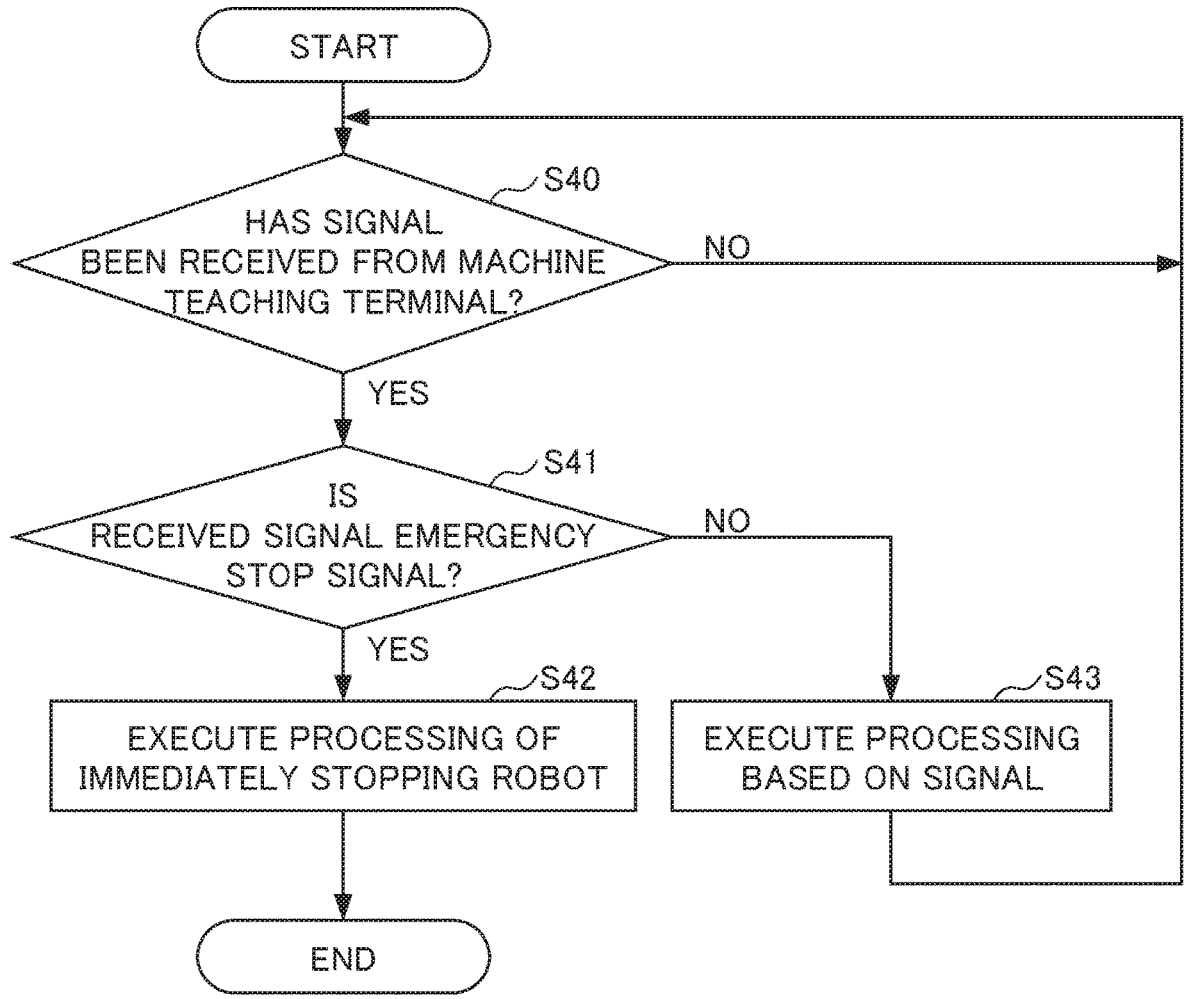
FIG. 7 is a flowchart indicating machine control processing in a teaching mode of the robot control device according to the first embodiment.

In S40 shown in FIG. 7, the control unit 40 of the robot control device 4 determines whether or not a signal has been received from the machine teaching terminal 1. In the case where a signal has been received (S40: YES), the control unit 40 advances the processing to S41. On the other hand, in the case where any signal has not been received (S40: NO), the control unit 40 makes the processing remain in the present step until a signal is received. In S41, the control unit 40 determines whether or not the signal received from the machine teaching terminal 1 is the emergency stop signal. In the case where the signal is the emergency stop signal (S41: YES), the control unit 40 advances the processing to S42. On the other hand, in the case where the signal is not the emergency stop signal (S41: NO), the control unit 40 advances the processing to S43.

In S42, the control unit 40 (the immediate op part 42) executes the processing immediately stopping the robot 5. Thee control unit 40 thereafter terminates the present processing. That is, in the case where the emergency stop signal is received from the machine teaching terminal 1, the control unit 40 immediately stops the robot 5. On the other hand, in S43, the control unit 40 (the teaching operation part 41) executes the control of teaching the robot 5 in accordance with the signal. The control unit 40 thereafter returns the processing to S40 and repeats the processing as long as the machine tea citing terminal 1 is in the teaching mode.

As described above, in the case where the input path fails to satisfy the specified condition, the control unit 10 of the machine teaching terminal 1 detects an abnormal state and transmits the emergency stop signal to the robot control device 4. That the machine teaching terminal 1 determines that the input state is not the safe input state on the basis of the input path, thereby allowing the use of a general-purpose terminal without providing an additional device. The machine teaching terminal 1 is then able to inform the robot control device 4 of being in the abnormal state during teaching.

The input operation to form the input path satisfying the specified condition is simple for the worker P. Therefore, the worker P is able to perform the operation indicating safety while performing teaching by using the machine teaching terminal 1. The robot control device 4 controls the robot 5 to stop immediately upon receiving the emergency stop signal, thereby enabling to avoid a danger to the worker P.

Second Embodiment

The second embodiment is described below. In the second embodiment, a safe input area is the area in which worker performs the input indicating being safe, and the safe input area is output to a machine teaching terminal so as to make the worker perform an input operation in the safe input area. In the following description, the parts having the same functions as those in the first embodiment described above are denoted by the same reference numerals or the same end reference numerals, and redundant descriptions are omitted as appropriate.

[Machine Teaching Terminal 201]

Figure 8:
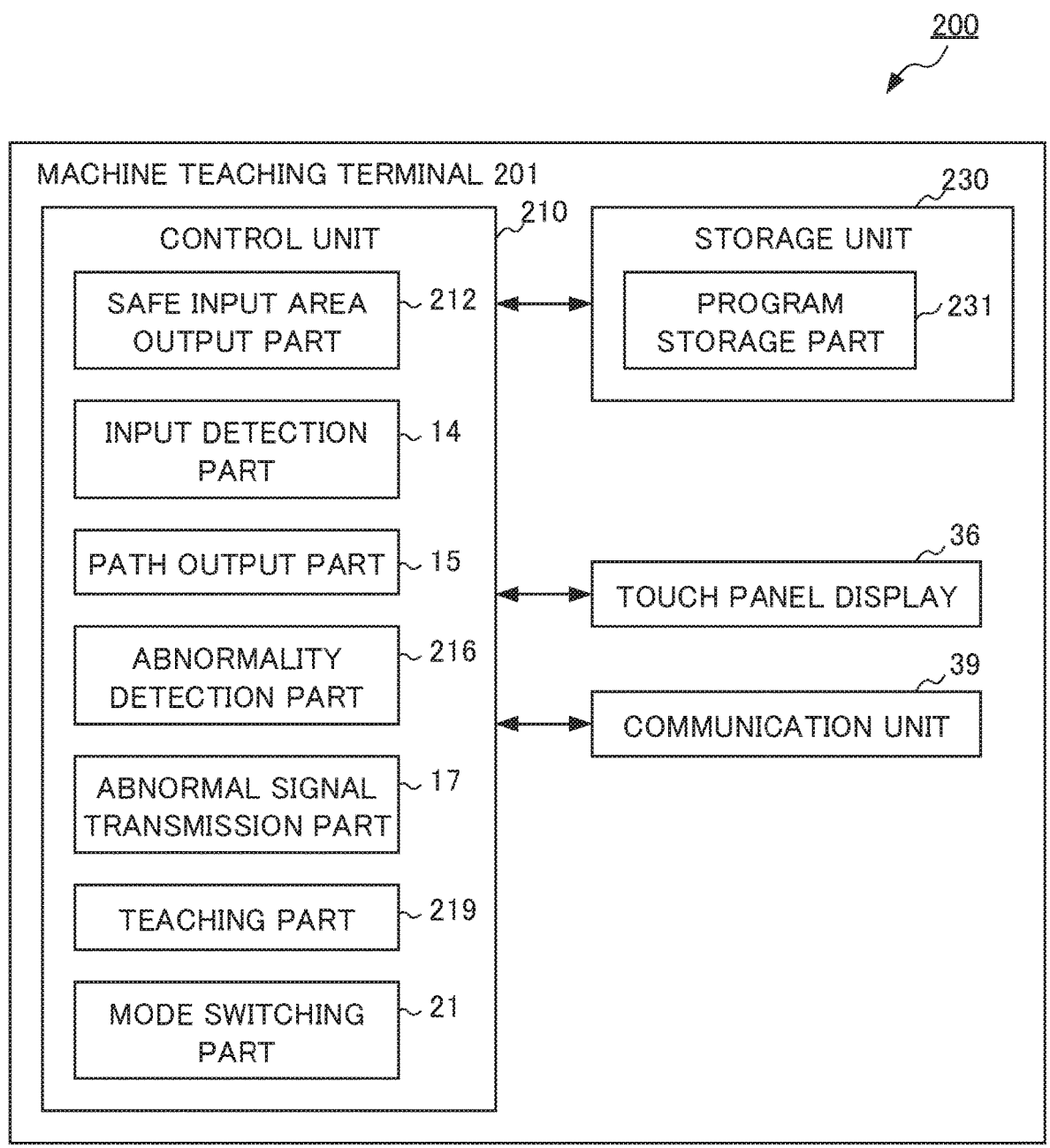
FIG. 8 is a functional block diagram of a machine teaching terminal according to a second embodiment.

As shown in FIG. 8, a machine teaching terminal 201 included in a teaching system 200 includes a control unit 210, a storage unit 230, the touch panel display 36, and the communication unit 39. The control unit 210 includes a safe input area output part 212, the input detection part 14, the path output part 15, an abnormality detection part 16, the abnormal signal transmission part 17, a teaching part 219, and the mode switching part 21.

The safe input area output part 212 outputs the safe input area in which the worker performs the input indicating being safe to the touch panel display 36. The abnormality detection part 216 detects an abnormal state when the input path formed by the continuous input detected by the input detection part 14 protrudes from the safe input area to the outside of the safe input area. In the case where input is detected in the teaching area other than the safe input area, the teaching part 219 transmits a teaching signal for performing the teaching based on the detection to the robot control device 4.

The storage unit 230 is the storage area in which the programs to be executed by the control unit 210 and the like are stored. The storage unit 230 includes a program storage part 231. The program storage part 231 stores various types of programs to be executed by the control unit 210 of the machine teaching terminal 201. The program storage part 231 stores the teaching program for executing the various types of functions of the control unit 210 described above.

The processing in the machine teaching terminal 201 is described below. The mode setting processing is the same as the one in the first embodiment (FIG. 3).

[Teaching Mode Processing]

The teaching mode processing is described below on the basis of FIG. 9. In S230 shown in FIG. 9, the control unit 210 (the safe input area output part 212) of the machine teaching terminal 201 outputs, for example, a teaching screen image 262 including a safe input area 262e shown in FIG. 10, to the touch panel display 36. The teaching screen image 262 includes the safe input area 262e on the left side of the screen image.

Figure 9:
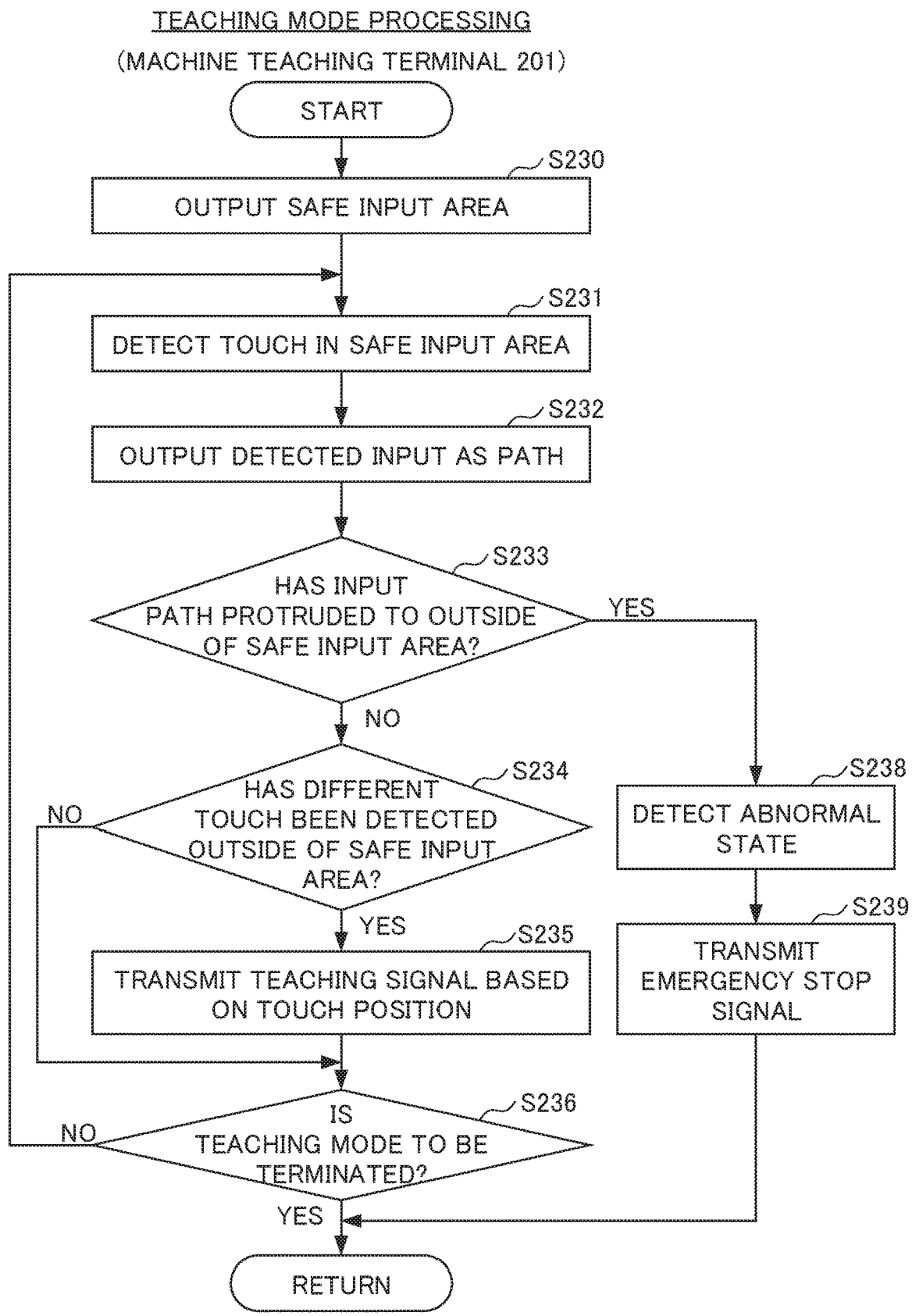
FIG. 9 is a flowchart indicating teaching mode processing of the machine teaching terminal according to the second embodiment.
Figure 10:
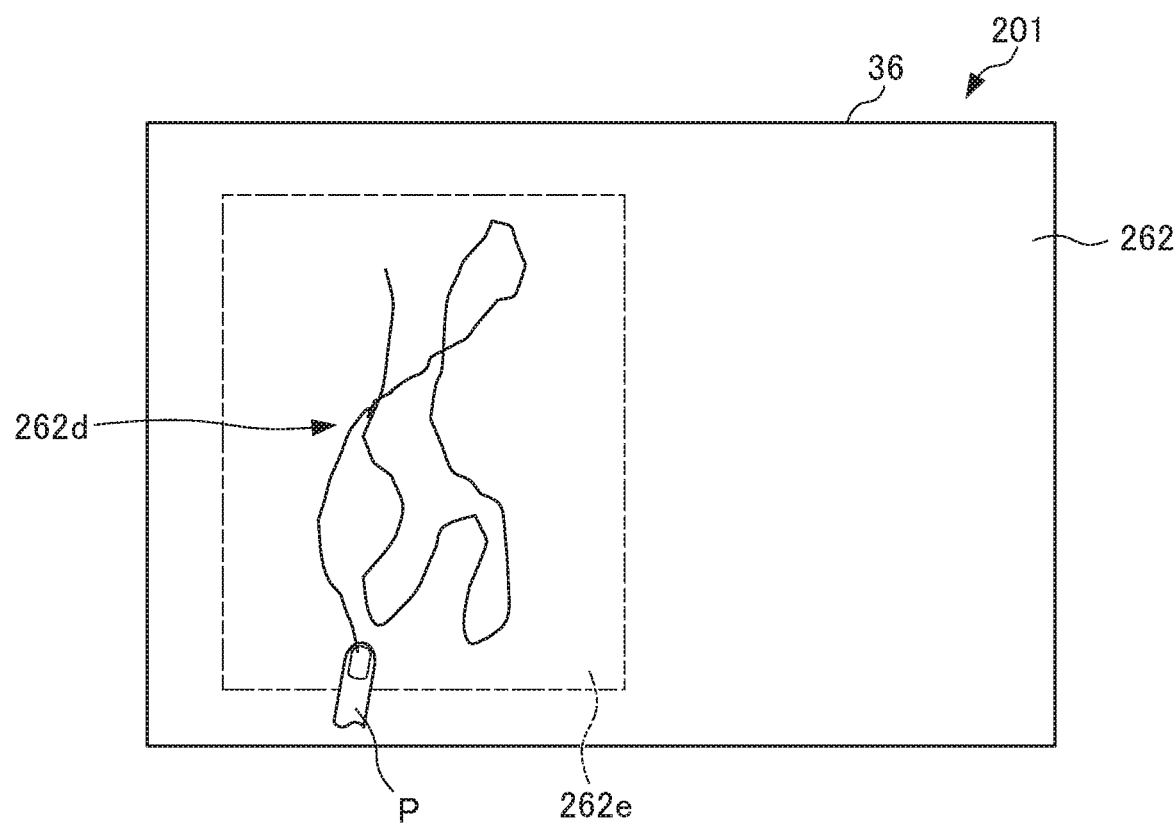
FIG. 10 is a diagram illustrating an operation example performed on the machine teaching terminal according to the second embodiment.

When the worker P touches an arbitrary position in the safe input area 262e of the teaching screen image 262 displayed on the touch panel display 36, the control unit 210 (the input detection part 14) detects the touch in S231 shown in FIG. 9. In S232, the control unit 210 (the path output part 15) outputs the detected input as a path to the touch panel display 36. FIG. 10 shows an input path 262d input in the safe input area 262e of the teaching screen image 262 on the basis of the operation by the worker P. It is noted that the control unit 210 may output the entire input path 262d shown in FIG. 10, may output the latest input path, or alternatively may not output the input path.

In S233 shown in FIG. 9, the control unit 210 determines whether or not the input path has protruded to the outside from the inside of the safe input area. In the case where the input path has protruded to the outside from the inside of the safe input area (S233: YES), the control unit 210 advances the processing to S238. On the other hand, in the case where the input path has not protruded to the outside from the inside of the safe input area (S233: NO), the control unit 210 advances the processing to S234.

In S234, the control unit 210 (the input detection part 14) determines whether or not different input (touch) from the detected input path has been detected outside the safe input area 262e. In the present example, the touch within the sane input area 262e is assumed to be performed by the worker P with the left finger, and the different touch outside the safe input area 262e is assumed to be performed by the worker P with the right finger. In the case where the different touch outside the safe input area 262e has been detected (S234: YES), the control unit 210 advances the processing to S235. On the other hand, in the case where the different touch outside the safe input area 262e has not been detected (S234: NO), the control unit 210 advances the processing to S236. In S235, the control unit 210 (the teaching part 219) transmits the teaching signal corresponding to the touch position of the different touch to the robot control device 4.

In S236, the control unit 210 (the input detection part 14) determines whether to terminate the teaching mode. In the case where the teaching mode is to be terminated (S236: YES), the control unit 210 returns the processing to S14 shown in FIG. 3. On the other hand, in the case where the teaching mode is not to be terminated (S236: NO), the control unit 210 returns the processing to S231.

The steps of S238 and S239 are the same as the steps of S38 and S39 of the first embodiment (FIG. 4), and detailed descriptions thereof are thus omitted.

As described above, the control unit 210 of the machine teaching terminal 201 detects an abnormal state and transmits the emergency stop signal to the robot control device 4 in the case where the input path to be formed by the continuous touch operation within the safe input area 262e has been formed outside the safe input area 262e. That is, the machine teaching terminal 201 determines that the input state is not the safe input state on the basis of whether or not the input path has been formed within the safe input area 262e, thereby allowing the use of a general teaching terminal without providing an additional device.

Third Embodiment

The third embodiment is described below. In the third embodiment, the area allowing the worker to perform the input is limited to the teaching area.

[Machine Teaching Terminal 301]

Figure 11:
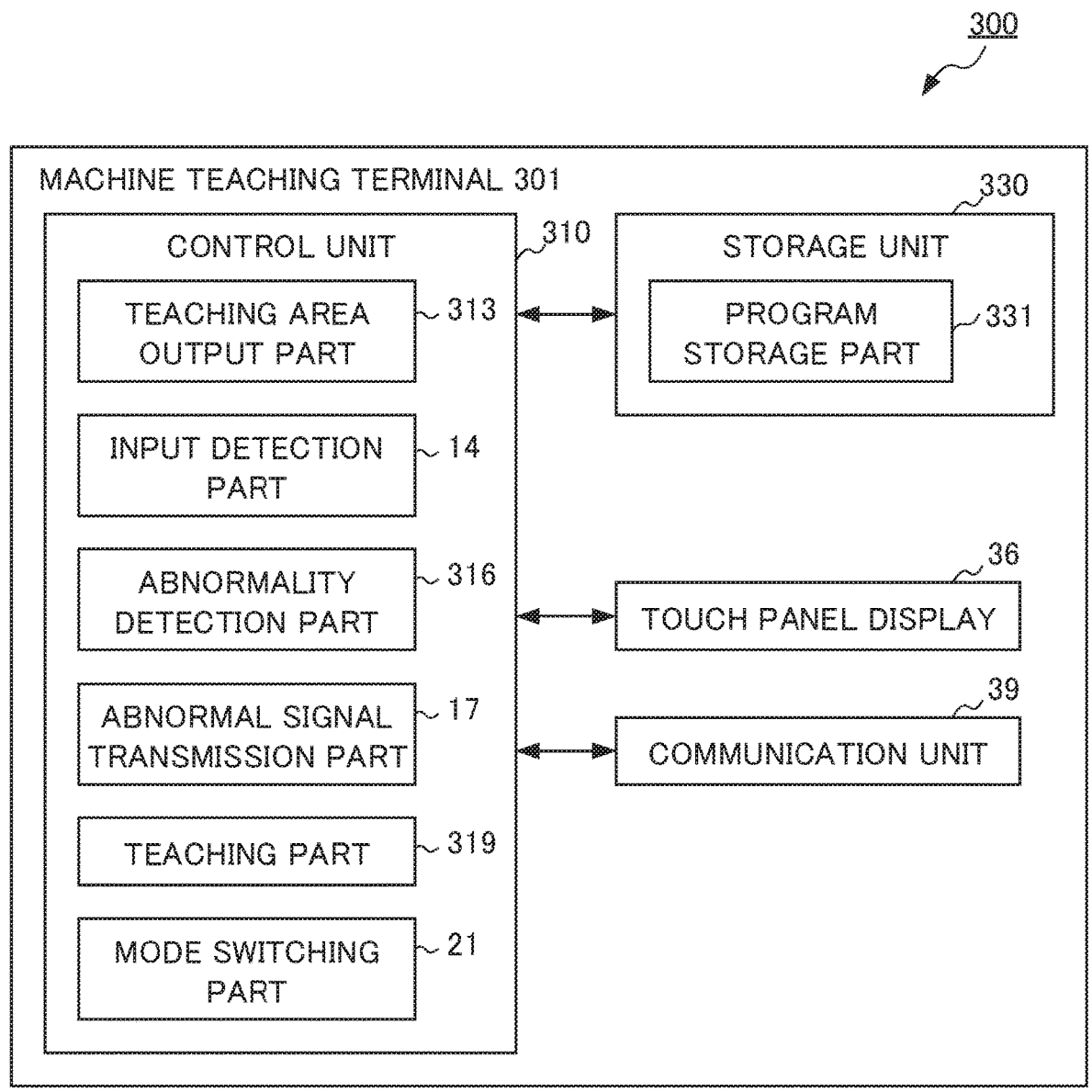
FIG. 11 is a functional block diagram of a machine teaching terminal according to a third embodiment.

As shown in FIG. 11, a machine teaching terminal 301 included in a teaching system 300 includes a control unit 310, a storage unit 330, the touch panel display 36, and the communication unit 39. The control unit 310 includes a teaching area output part 313, the input detection part 14, an abnormality detection part 316, the abnormal signal transmission part 17, a teaching part 319, and the mode switching part 21.

The teaching area output part 313 outputs the teaching area in which the worker P performs input for teaching the robot 5 to the touch panel display 36. The abnormality detection part 316 detects an abnormal state in the case where the position of the input detected by the input detection part 14 is outside the teaching area. In the case where input is detected within the teaching area, the teaching part 319 transmits a teaching signal for per the teaching based on the detection to the robot control device 4.

The storage unit 330 is the storage area in which the programs to be executed by the control unit 310 and the like are stored. The storage unit 330 includes a program storage part 331. The program storage part 331 stores various types of programs to be executed by the control unit 310 of the machine teaching terminal 301. The program storage part 331 stores the teaching program for executing the various types of functions of the control unit 310 described above.

The processing in the machine teaching terminal 301 is described below. The mode setting processing is the same as the one in the first embodiment (FIG. 3).

[Teaching Mode Processing]

The teaching mode processing is described below on the basis of FIG. 12. In S330 shown in FIG. 12, the control unit 310 (the teaching area output part 313) of the machine teaching terminal 301 outputs, for example, a teaching screen image 370 including a teaching area 370f shown in FIG. 13, to the touch panel display 36. The teaching screen image 370 includes the teaching area 370f on the right side of the screen image.

Figure 12:
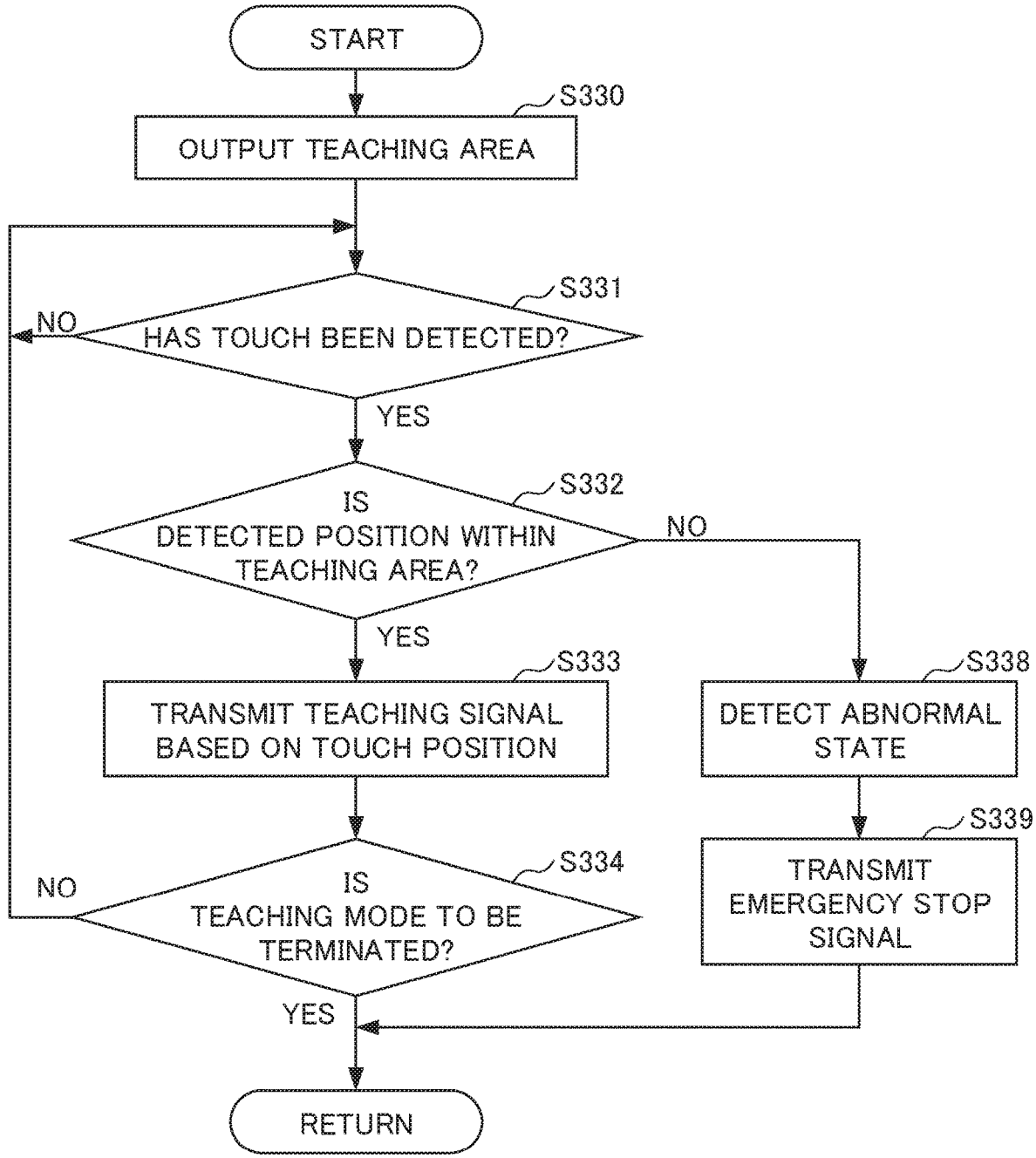
FIG. 12 is a flowchart indicating teaching mode processing of the machine teaching terminal according to the third embodiment.
Figure 13:
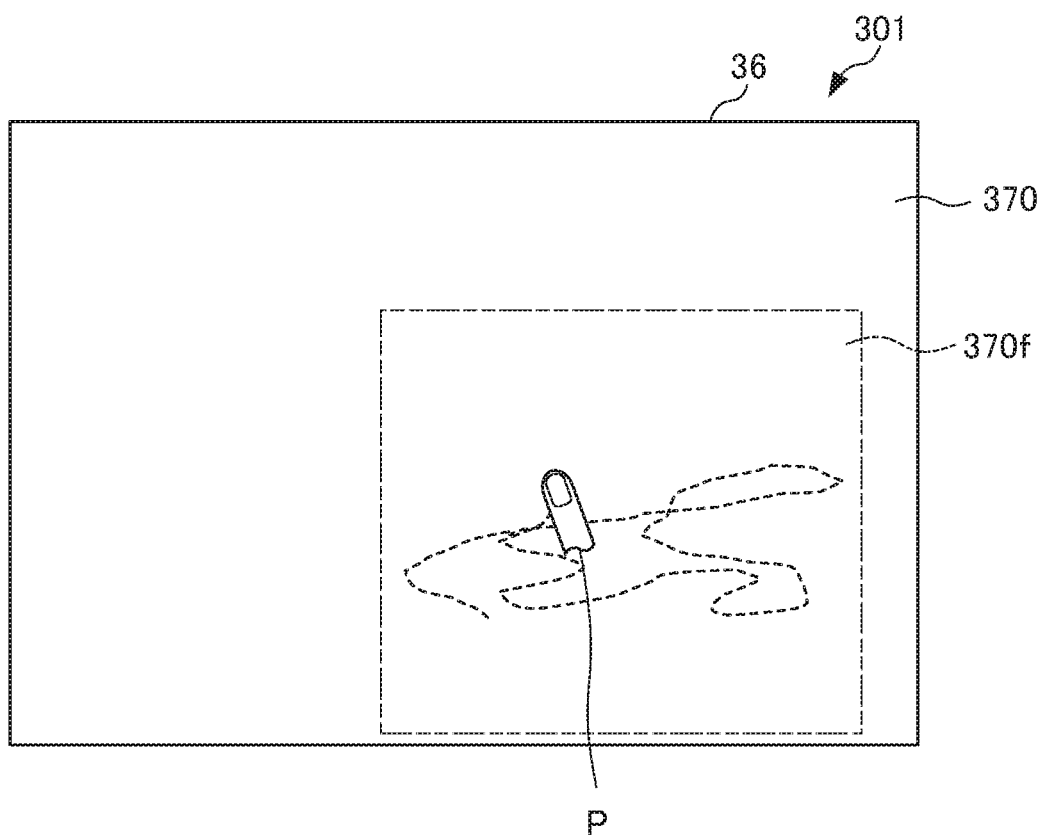
FIG. 13 is a diagram illustrating an operation example performed on the machine teaching terminal according to the third embodiment.

In S331 shown in FIG. 12, the control unit 310 (the input detection part 14) determines whether or not a touch has been detected. When the worker P touches an arbitrary position in the teaching screen image 370 displayed on the touch panel display 36, the control unit 310 detects the touch. In the case of having detected the touch (S331: YES), the control unit 310 advances the processing to S332. On the other hand, in the case of not having detected the touch (S331: NO), the control unit 310 makes the processing remain in the present step until detecting the touch. In S332, the control unit 310 (the input detection part 14) determines whether or not the position at which the touch has been detected is within the teaching area 370f. In the case where the position is within the teaching area 370f (S332: YES), the control unit 310 advances the processing to S333. On the other hand, in the case where the position is not within the teaching area 370f (S332: NO), the control unit 310 advances the processing to S338.

In S333, the control unit 310 (the teaching part 319) transmits the teaching signal corresponding to the detected touch position to the robot control device 4. In S334, the control unit 310 determines whether to terminate the teaching work. For example, when the worker P operates an icon (not shown) for terminating the teaching work displayed in the teaching area 370f, the control unit 310 determines that the teaching work is to be terminated. In the case where the teaching work is to be terminated (S334: YES), the control unit 310 returns the processing to S14 shown in FIG. 3. On the other hand, in the case where the teaching work is not to be terminated (S334: NO), the control unit 310 returns the processing to S331.

The steps of S338 and S339 are the same as the steps of S38 and S39 of the first embodiment (FIG. 4), and detailed descriptions thereof are thus omitted.

As described above, the control unit 310 of the machine teaching terminal 301 transmits the teaching signal to the robot control device 4 upon the touch operation performed within the teaching area 370f. The control unit 310 detects an abnormal state and transmits the emergency stop signal to the robot control device 4 upon the touch operation performed outside the teaching area 370f. That is, the machine teaching terminal 301 determines that the it state is not the safe input state on the basis of whether or not the performed touch is within the teaching area 370f, thereby allowing the use of a general-purpose terminal without providing an additional device.

It is noted that the programs to be used in respective embodiments are able to be stored by the use of various types of non-transitory computer readable media and supplied to a computer. Non-transitory computer readable media include various types of tangible storage media. Examples of the non-transitory computer readable media include magnetic storage media (e.g., flexible disk, magnetic tape, hard disk drive), magneto-optical media (e.g., magneto-optical disk), CD-ROM (read only memory), CD-R, CD-R/W, and semiconductor memory (e.g., mask ROM, PROM (programmable ROM), EPROM (erasable PROM), flash ROM, RAM (random access memory)). The programs may be supplied to a computer by various types of transitory computer readable media. Examples of the transitory computer readable media include an electrical signal, an optical signal, and an electromagnetic wave. Such transitory computer readable media are capable of supplying programs to a computer via a wired communication path such as an electrical wire and an optical fiber or a wireless communication path.

The above-described embodiments are preferred embodiments of the present invention. The scope of present invention is not limited only to the above-described embodiments. Various modifications are available without deviating from the gist of the present invention.

(Modification 1)

In the descriptions of the above embodiments, an industrial robot is subjected to the teaching by the machine teaching terminal. The present invention is not limited thereto. Any other machine may be used, as long as the machine is able to avoid the unexpected action thereof and ensure the safety of a machine and a worker in the periphery thereof. The machine may be, for example, industrial machines such as a robot for service or a machine tool to be controlled by a computerized numerical control (CNC) machine. A control device is not limited to a robot control device. Any other control device may be used as long as the control device controls at least a machine tool or a machine including a robot.

(Modification 2)

In the description of the first embodiment, as the specified condition, the input path is formed by the repeated input of starting in the vicinity of the start point, moving away from the start point by a certain distance, and thereafter returning back to the returning area within a certain time. The present invention is not limited thereto. For example, the input path may be formed by the repeated input of protruding to the outside from the inside of the predetermined range and thereafter returning back to the predetermined range. A fixed time and/or a fixed distance may be appropriately set (or may not be set) for each worker P.

EXPLANATION OF REFERENCE NUMERALS

1, 201, 301 MACHINE TEACHING TERMINAL
4 ROBOT CONTROL DEVICE

5 ROBOT
10, 40, 210, 310 CONTROL UNIT
11 START POINT OUTPUT PART
14 INPUT DETECTION PART
15 PATH OUTPUT PART
16, 216, 316 ABNORMALITY DETECTION PART
17 ABNORMAL SIGNAL TRANSMISSION PART
19, 219, 319 TEACHING PART
21 MODE SWITCHING PART
30, 45, 230, 330 STORAGE UNIT
36 TOUCH PANEL DISPLAY (TOUCH PANEL, DISPLAY)
41 TEACHING OPERATION PART
42 IMMEDIATE STOP PART
60, 61, 262, 370 TEACHING SCREEN IMAGE
60A, 61A. START POINT
60B RETURNING AREA.
100, 200, 300 TEACHING SYSTEM
212 SAFE INPUT AREA OUTPUT PART
262E SAFE INPUT AREA
313 TEACHING AREA. OUTPUT PART
370F TEACHING AREA
E WORK AREA
P WORKER

What is claimed is:

1. A machine teaching terminal communicably connected to a machine so as to be used for teaching the machine within a work area of the machine, the machine teaching terminal comprising:
   a touch panel configured to accept input performed by a worker;
   an input detection part configured to detect a continuous input to the touch panel;
   an abnormality detection part configured to detect an abnormal state on the basis of the detection by the input detection part; and
   an abnormal signal transmission part configured to transmit, in a case where the abnormality detection part detects the abnormal state, a signal indicating the abnormal state to the machine, wherein
   the abnormality detection part detects the abnormal state in a case where an input path formed by the continuous input detected by the input detection part fails to satisfy a specified condition.

2. The machine teaching terminal according to claim 1, the machine teaching terminal comprising:
   a start point output part configured to output a predetermined range including a start point to a display, wherein
   the input path satisfying the specified condition is formed by repeated input of protruding to an outside from an inside of the predetermined range and thereafter returning back to the predetermined range.

3. The machine teaching terminal according to claim 2, wherein
   the start point output part outputs the start point and the predetermined range to the display, and
   the input path satisfying the specified condition is formed by repeated input within a certain time of moving away from a vicinity of the start point by a certain distance and thereafter returning back to the predetermined range.

4. The machine teaching terminal according to claim 1, wherein
   the input path satisfying the specified condition is formed in a case where a shifting amount in touch operation per a certain time is equal to or greater than a first predetermined amount or less than a second predetermined amount, and
   the first predetermined amount and the second predetermined amount are variably set for each worker.

5. The machine teaching terminal according to claim 1, the machine teaching terminal comprising:
   a teaching part configured to perform, on the basis of not only the input path formed by the continuous input detected by the input detection part but also input additionally detected by the input detection part, teaching based on the detection.

6. The machine teaching terminal according to claim 1, the machine teaching terminal comprising:
   a safe input area output part configured to output, to a display, a safe input area corresponding to a range allowing the worker to perform input indicating being in a safe input state, wherein
   the abnormality detection part detects the abnormal state in a case where an input path formed by the continuous input detected by the input detection part moves from the safe input area to an outside of the safe input area.

7. The machine teaching terminal according to claim 6, wherein
   the safe input area is different from a teaching area corresponding to an area allowing the machine to be taught,
   the machine teaching terminal comprising:
   a teaching part configured to perform, in a case where a position of the input detected by the input detection part is within the teaching area, teaching based on the detection.

8. The machine teaching terminal according to claim 1, the machine teaching terminal comprising:
   a path output part configured to output the input path detected by the input detection part to the display.

9. The machine teaching terminal according to claim 1, the machine teaching terminal comprising:
   a teaching area output part configured to output a teaching area corresponding to an area allowing the machine to be taught to a display; and
   a teaching part configured to perform, in a case where the input detection part detects input within the teaching area, teaching based on the detection, wherein
   the abnormality detection part detects the abnormal state in a case where a position of the input detected by the input detection part is outside the teaching area.

10. The machine teaching terminal according to claim 1, the machine teaching terminal comprising:
    a mode switching part configured to switch a mode between a teaching mode for teaching the machine and a non-teaching mode other than the teaching mode, wherein
    the abnormality detection part detects the abnormal state in a case where the teaching mode is set by switching by the mode switching part.

11. The machine teaching terminal according to claim 10, wherein
    the mode switching part switches the non-teaching mode to the teaching mode in a case where the input detection part continues to detect a touch at a specific position on the touch panel in a certain time or where the input detection part continues to detect a plurality of times of touches within a specified area on the touch panel in a certain time.

12. A machine configured to perform work based on a signal from the machine teaching terminal according to claim 1, the machine including:
an immediate stop part configured to immediately stop the machine in a case where the signal indicating the abnormal state is received.

13. A non-transitory computer readable medium configured to store a program for a computer serving as a machine teaching terminal communicably connected to a machine so as to be used for teaching the machine in a work area of the machine, the computer comprising a touch panel configured to accept input performed by a worker, and the program provided to make the computer execute steps including:
an input detection step of detecting a continuous input to the touch panel;
an abnormality detection step of detecting an abnormal state on the basis of the detection in the input detection step; and
an abnormal signal transmission step of, in a case where the abnormal state is detected in the abnormality detection step, transmitting a signal indicating the abnormal state to the machine, wherein
the abnormality detection step detects the abnormal state in a case where an input path formed by the continuous input detected by the input detection step fails to satisfy a specified condition.

14. A safety confirmation method for a machine teaching terminal communicably connected to a machine so as to be used for teaching the machine within a work area of the machine, the machine teaching terminal comprising
a touch panel configured to accept input performed by a worker,
the safety confirmation method being executed by the machine teaching terminal, and
the safety confirmation method including:
an input detection step of detecting a continuous input to the touch panel;
an abnormality detection step of detecting an abnormal state on the basis of the detection in the input detection step; and
an abnormal signal transmission step of, in a case where the abnormal state is detected in the abnormality detection step, transmitting a signal indicating the abnormal state to the machine, wherein
the abnormality detection step detects the abnormal state in a case where an input path formed by the continuous input detected by the input detection step fails to satisfy a specified condition.

* * * * *